May 17, 1966  D. R. CAMPBELL ETAL  3,251,575

VALVE

Filed Dec. 23, 1963  2 Sheets-Sheet 1

INVENTORS
Donald R. Campbell
Carl J. Nelson
BY
Clarence R. Patty, Jr.

ATTORNEY

May 17, 1966 D. R. CAMPBELL ETAL 3,251,575

VALVE

Filed Dec. 23, 1963 2 Sheets-Sheet 2

INVENTORS
Donald R. Campbell
Carl J. Nelson

BY *Clarence R. Patty, Jr.*

ATTORNEY

United States Patent Office 3,251,575
Patented May 17, 1966

3,251,575
VALVE
Donald R. Campbell, Corning, and Carl J. Nelson, Elmira,
N.Y., assignors to Corning Glass Works, Corning, N.Y.,
a corporation of New York
Filed Dec. 23, 1963, Ser. No. 332,417
5 Claims. (Cl. 251—214)

This invention relates to valves and more particularly to plug valves for use in pipe lines for conveying corrosive fluids.

It is an object of the invention to provide a valve the moving parts of which are completely separated from fluids being carried in a pipe system including such valve by means of an inert material which is not attacked by corrosive materials of the types commonly carried in chemical pipe systems.

It is a further object to provide a novel supporting structure for the corrosion-resistant covering which separates the operating mechanism of a plug valve from fluids being carried in a pipe system including such valve so as to minimize the strains to which such covering is subjected and concomitantly to maximize the life of such covering.

These and other objects, which will be apparent from the detailed description of the invention, are accomplished by the provision of a bellows-like covering supported on a plurality of rigid rings surrounding a stepped shaft upon which a valve plug is supported and caused to reciprocate.

Figure 1:
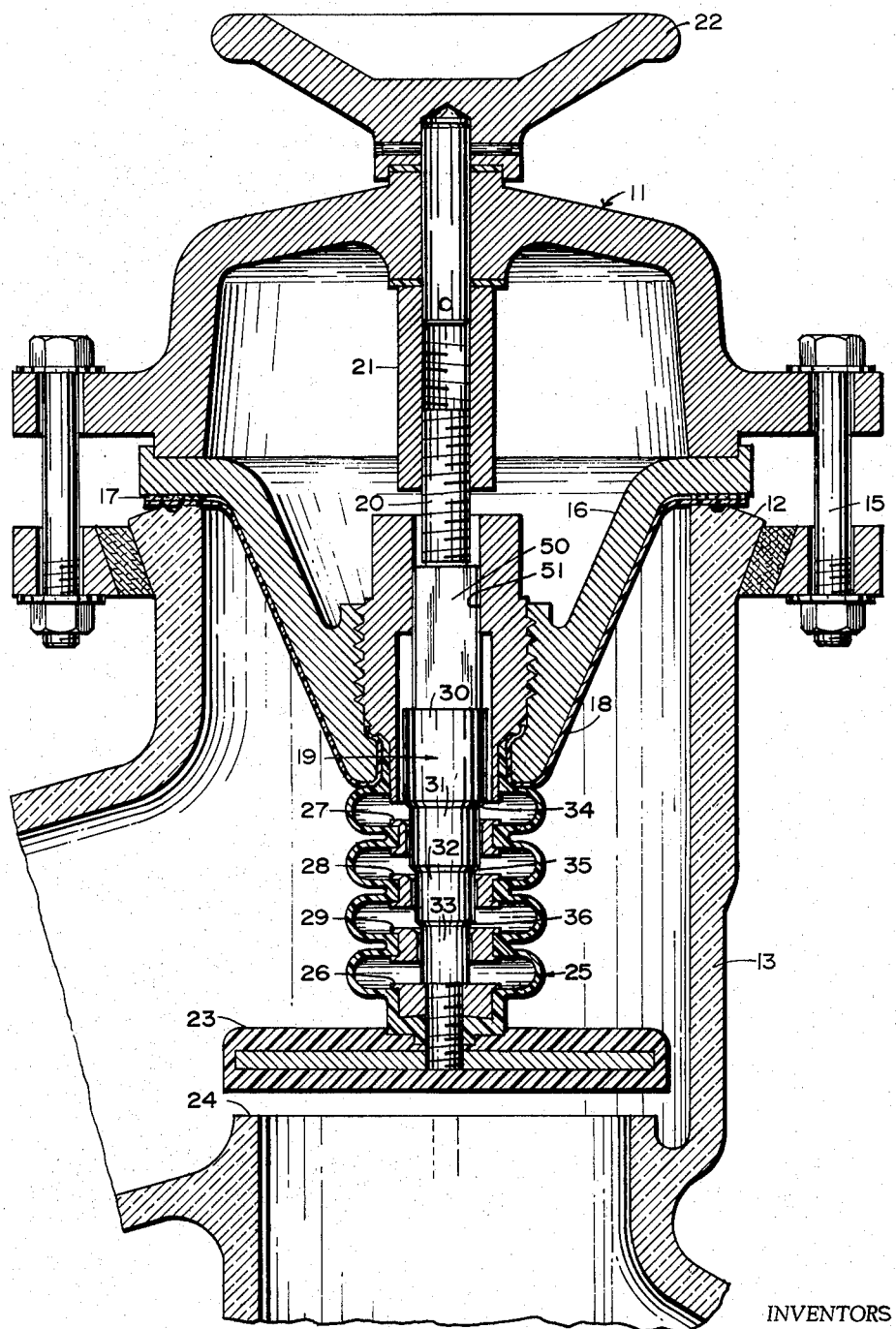
Figure 2:
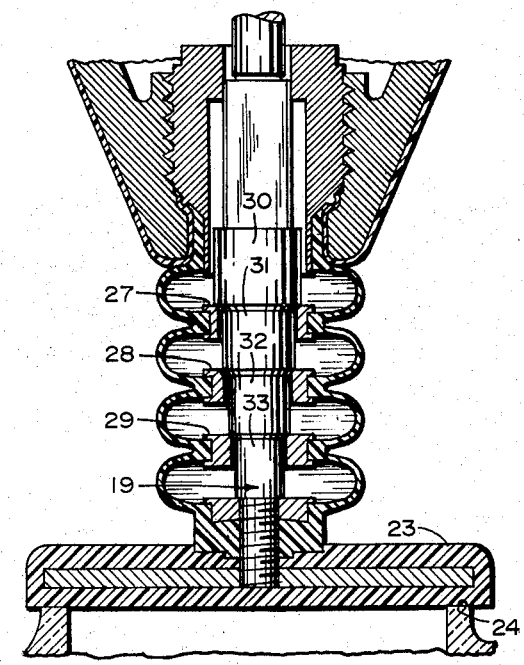
Figure 3:
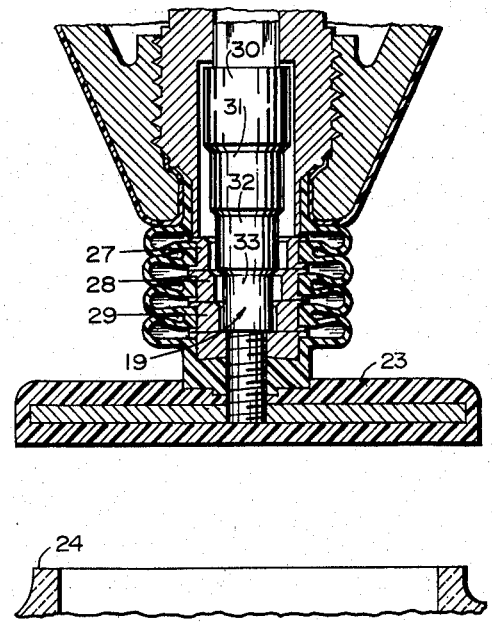
Figure 4:
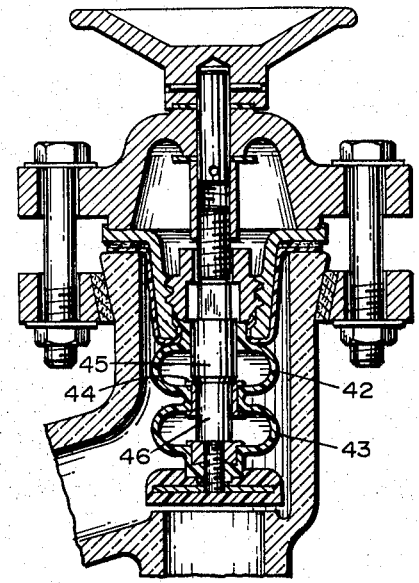

The invention will be described with reference to the accompanying drawings, in which:

FIGURE 1 is a sectional view through a valve according to the invention, showing the valve plug at an intermediate position between its open and closed positions, FIGURE 2 is a sectional view of a portion of the valve of FIGURE 1 with its plug in the closed position, FIGURE 3 is a view similar to that of FIGURE 2 showing the plug in its open position, and FIGURE 4 is a sectional view of a portion of an alternative form of valve according to the invention.

Referring to FIGURES 1–3, in its preferred embodiment, the valve of the present invention comprises housing 11, which is held tightly across rim 12 of one opening in a glass enclosure 13 adapted for inclusion in a continuous system of glass pipe. Clamping bolts, such as 15, maintain liner support 16, gasket 17 and liner 18 between housing 11 and rim 12. Shaft 19 is longitudinally reciprocable in liner support 16. Since the upper portion 50 of shaft 19 is square in cross-section and reciprocates longitudinally in square guide channel 51 of the liner support, rotation of the shaft is prevented. Reciprocation is effected by means of threaded shaft portion 20, which moves in internally threaded cylinder 21 an handle 22 is rotated. Since cylinder 21 is rigidly attached to handle 22, it is not free to move longitudinally, but its motion is limited to rotation about its axis. Accordingly, depending upon the direction of rotation of cylinder 21, shaft 20 will be moved either upwardly or downwardly, respectively moving plug 23 to its open or closed positions with respect to rim 24.

Liner support 16 is protected from the action of corrosive fluids carried in the pipe system by means of liner 18, which comprises a corrosion-resistant material, preferably tetrafluoroethylene. Shaft 19 is similarly protected by means of bellows 25, which comprises an inert flexible material, preferably tetrafluoroethylene. Bellows 25 is tightly held against plug 23 by means of ring 26. Plug 23 preferably comprises an outer portion comprising a mixture by weight of approximately 75% tetrafluoroethylene and 25% pulverized glass surrounding a metallic core, as illustrated. Alternatively, liner 18, bellows 25 and the outer portion of plug 23 may be a single integral piece of corrosion-resistant material.

As handle 22 is rotated, shaft 19 will be either raised or lowered, depending upon the direction of rotation of the handle. As shaft 19 is raised and lowered, bellows 25 will contract and expand respectively. In the absence of means for assuring uniform flexure of the respective convolutions of the bellows, variations in the temperature of such convolutions and random variations in the structural strength thereof will at times cause some convolutions to be deformed more than others. Such unequal expansion and contraction of the respective convolutions decreases the life of the bellows.

Accordingly, the present invention provides means for programming the expansion and contraction of the bellows and for maintaining within relatively narrow limits variations in the flexure of the respective convolutions of the bellows. Such control over the action of the bellows is accomplished by means of the illustrated structure, wherein the junctures between the respective convolutions of the bellows are supported by means of metallic rings, such as rings 27, 28 and 29. In the embodiment illustrated in FIGURES 1–3, these rings have substantially equal outer diameters, corresponding to the inner diameter of the bellows at such junctures. The inner diameters of such rings on the other hand, decrease progressively from those located near the top of shaft 19 to those located near the bottom thereof. Similarly, shaft 19 comprises a plurality of stepped portions 30, 31, 32 and 33 having diameters decreasing from the top of the shaft to the bottom thereof. The respective pairs of rings and shaft steps 27 and 31, 28 and 32, and 29 and 33 are constructed such that the inner diameter of the ring is slightly larger than the outer diameter of the shaft step, but smaller than that of the next larger shaft step. The longitudinal heights of the respective steps of shaft 19 are substantially equal to one another, and the longitudinal heights of the respective rings are similiarly substantially equal to one another. The heights of the steps are greater than the heights of the rings.

Bellows 25 is preferably constructed such that when shaft 19 is lowered to close plug 23 over the opening defined by rim 24, the bellows is placed in tension. That is, at positions other than the valve open position illustrated in FIGURE 3 the bellows has a tendency to contract longitudinally. As previously mentioned, the present valve is intended for use in pipe systems which carry fluids at temperatures higher than those of the ambient atmosphere. Since such fluids tend to contact only the lower convolutions of bellows 25, the upper convolutions thereof generally being above the fluid level, there is a tendency for the lower convolutions in valves such as the present valve to be at higher temperatures than convolutions farther away from the plug. Since conventional bellows materials, such as tetrafluoroethylene, tend to soften and become weaker as their temperatures increase, the result of the temperature differential imposed along bellows 25 is to weaken the lower convolutions, while upper convolutions are less affected. Since the bellows is in longitudinal tension, the weaker lower convolutions tend to expand longitudinally, while a corresponding contraction of the upper convolutions takes place. In the absence of means for regulating the positions of the convolutions, the increased flexure to which the lower convolutions are subjected during the opening and closing of the valve will greatly lessen their operational life, and failures will soon result in the lower convolutions of the bellows.

It is for this reason that shaft 19 is provided with steps 30, 31, 32 and 33, and bellows 25 is supported on rigid metallic rings 27, 28 and 29, which respectively have inner diameters only slightly larger than shaft steps 31, 32 and 33. Since rings 27, 28 and 29 have inner diameters which are smaller respectively than the diameters of shaft steps 30, 31 and 32, as shaft 19 is caused to move downwardly by the rotation of handle 22, the highest positions of the respective rings are limited. The heights of the shaft steps are determined such that when the valve is closed, as illustrated in FIGURE 2, shaft 19 presents a series of equal steps, which the bellows-supporting rings contact and which steps prevent the upward movement of the rings. Thus, if higher temperatures near the bottom of the bellows effect weakening of the bottom portion of the bellows, the tendency of the lower convolutions to expand longitudinally and of the upper convolutions to contract longitudinally will be counteracted by the interaction between the upper edges of rings 27, 28 and 29 with shoulders 34, 35 and 36, respectively. It will be noted that, although the present arrangement does not prevent longitudinal contraction of the lower bellows convolutions, such contraction is not a great problem with valves of the present type, which are intended primarily for use in systems carrying fluids at elevated temperatures, since, as previously mentioned, an effect of such temperatures is to cause the lower convolutions to tend to expand rather than to contract.

When plug 23 is in its open position, illustrated in FIGURE 3, the longitudinal contraction of the respective bellows convolutions is limited by the fact that the bellows-supporting rings have finite longitudinal thicknesses. Thus, in the valve open position, the minimum distance between the crests of any two adjacent convolutions will be approximately equal to the longitudinal thickness of the ring which forms a common support therebetween.

Shoulders 34, 35 and 36 between the shaft step portions are chamfered, as are the upper inner edges of bellows-supporting rings, in order to effect the centering of the rings about shaft 19 when the valve is closed and to facilitate the passage of the rings over the shoulders of smaller step portions when the valve position is changed from open to closed. The angles of the chamfered surfaces on the rings and the step portions are preferably approximately equal, such that the respective chamfered surfaces contact one another when the valve is closed.

It will be appreciated that the exact heights of the respective shaft steps and bellows-supporting rings will be determined by both the dimensions of the various valve components and the amount of travel to which the plug is to be subjected in moving from its open to its closed positions. In general, the optimum amount of permissible plug travel will be a function of the difference between the sum of the heights of the shaft steps and the sum of the heights of the supporting rings.

The number of shaft steps and the number of rings will vary according to valve size. As illustrated in FIGURE 4, valves according to the present invention may comprise as few as one movable supporting ring 44 and two bellows convolutions 42 and 43 surrounding a shaft comprising two steps 45 and 46.

It will be understood that the programming means of the present valve will be operative in any valve wherein there is a tendency of the convolutions of a bellows to become displaced in a direction away from the valve plug. For example, the present invention will be advantageous in programming bellows wherein variations in the strengths of the respective convolutions tend to cause unequal expansion and contraction, and in programming bellows having geometric configurations which tend to result in forces directed away from the valve plug when the bellows is subjected to varying external pressures.

It will be appreciated that, although the inner surfaces of the supporting rings and the outer surfaces of the stepped portions of the shaft have been illustrated in the form of circular cylinders, this shape is not essential. Surfaces other than circular cylinders may be employed, as long as each ring is slidable longitudinally along a corresponding shaft step portion while being relatively immovable in a transverse direction relative to such step portion. In general, the opposed portions of each said surface will include a cylindrical portion, although such portion will not necessarily be a circular cylinder. In the appended claims, when the diameters of the cylindrical parts of the present valve are compared, inasmuch as the cylinders referred to are not necessarily circular cylinders and hence do not each have a single diameter, it is to be understood that the diameters being compared are diameters at corresponding locations about the periphery of the shaft.

Inasmuch as the above description has been provided solely as that of preferred embodiments of the present invention, it is intended that the scope of the invention be limited only by the scope of the appended claims.

We claim:

1. A valve assembly comprising a housing, a plug within said housing reciprocable on a shaft passing through said housing, means for reciprocating said shaft, and a bellows-like covering surrounding said shaft and having one end fixed with respect to said housing and having its remaining end movable with said plug, said shaft comprising a plurality of step portions comprising substantially cylindrical surfaces having diameters varying from one another, each said cylindrical surface having a diameter greater than the diameters of all other said cylindrical surfaces between said surface and said plug, said covering comprising at least two convolutions supported at a juncture therebetween by a ring surrounding said shaft, said ring having an inner surface comprising a substantially cylindrical surface of larger diameter than that of a corresponding shaft portion cylindrical surface but of smaller diameter than that of the said shaft portion cylindrical surface of next larger diameter.

2. A valve according to claim 1 in which said covering comprises tetrafluoroethylene.

3. A valve assembly comprising a housing, a plug within said housing reciprocable on a shaft passing through said housing, at least two rims in said housing defining openings therein, said plug being reciprocable into and out of sealing engagement with one said rim, means for reciprocating said shaft, and a bellows-like covering surrounding said shaft and having one end fixed with respect to said housing and having its remaining end movable with said plug, said shaft comprising a plurality of step portions comprising substantially cylindrical surfaces having diameters varying from one another, each said surface having a diameter greater than the diameters of all other said surfaces between said surface and said plug, said covering comprising a plurality of convolutions supported at junctures therebetween by rings surrounding said shaft, each said ring having an inner surface comprising a substantially cylindrical surface of larger diameter than that of a corresponding shaft portion cylindrical surface but of smaller diameter than that of the said shaft portion cylindrical surface of next larger diameter, the diameter of each ring inner cylindrical surface being greater than the diameters of all other said ring inner cylindrical surfaces located between said ring inner cylindrical surface and said plug.

4. A valve according to claim 2 in which said rings have outer surfaces in the form of cylinders of equal diameter.

5. A valve according to claim 2 in which the inner edges of said rings on the sides thereof farthest from said plug are chamfered and the edges of said step portions of said shaft are chamfered.

No references cited.

ISADOR WEIL, *Primary Examiner.*